Patented Feb. 5, 1935

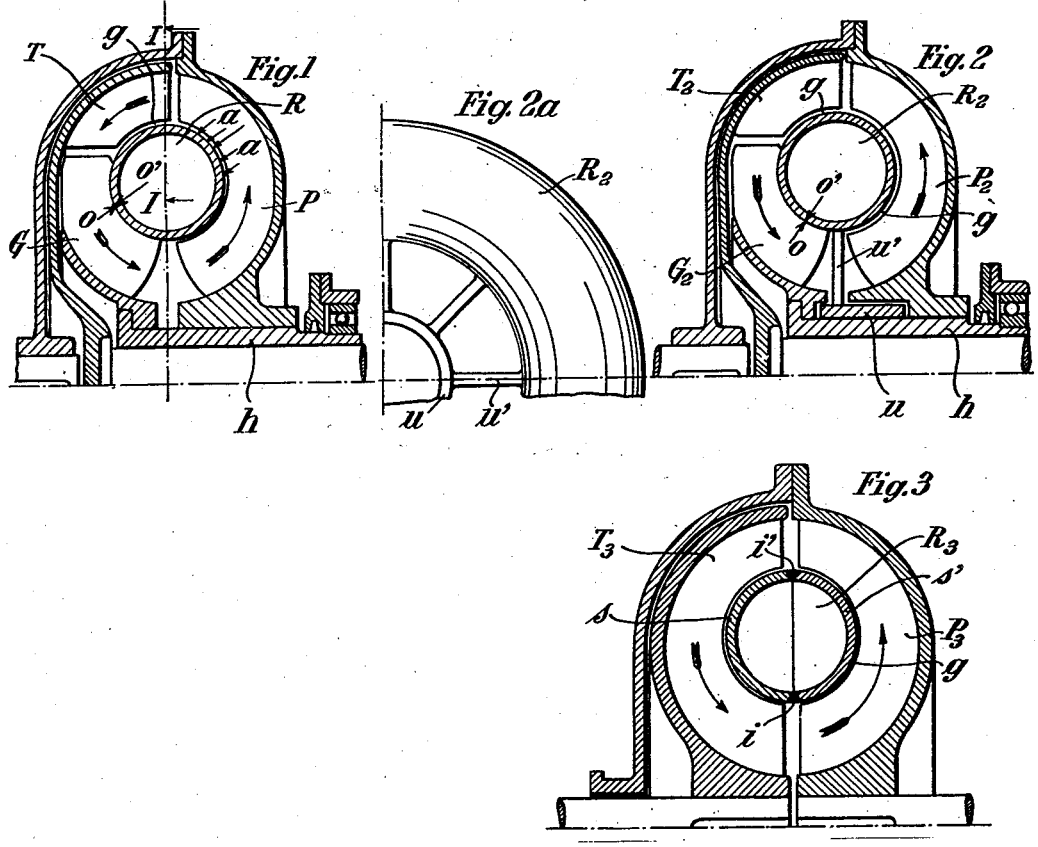
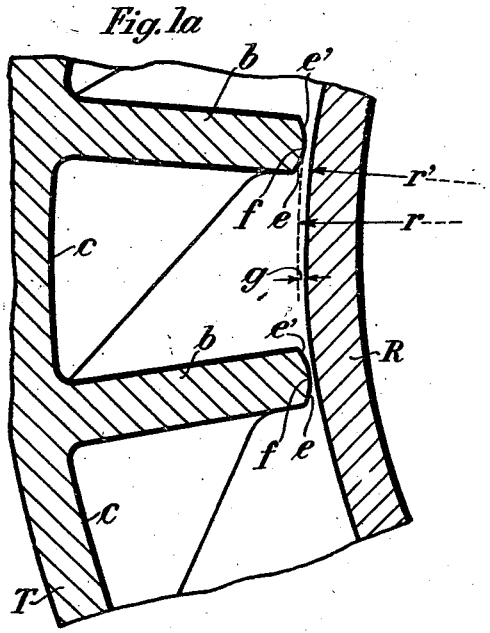

1,990,021

UNITED STATES PATENT OFFICE 1,990,021

HYDRODYNAMIC COUPLING FOR ROTARY SHAFTS

Hanns Stephan Wilhelm Böllinger, Frankenthal, Germany

Application January 26, 1934, Serial No. 708,449
In Germany February 3, 1933

6 Claims. (Cl. 60—54)

My invention relates to devices for transmitting mechanical power from one rotary shaft to another rotary shaft through a liquid medium, and more especially to improvements in power transmission devices of the hydrodynamic types, having one single closed circuit within which the working fluid circulates, and which include torque converters and couplings in which no torque conversion takes place, collectively hereinafter called hydrodynamic couplings. Within the latter according to the flow and reaction principle by the impeller wheel of a centrifugal pump, keyed to the primary or driving shaft, the liquid medium is thrown against and forced under pressure through the bladed wheel or wheels of a turbine, by which the secondary shaft is driven.

The primary object of this invention is to provide an improved hydrodynamic coupling exhibiting an unusually high factor of efficiency in which by the provision of bladed wheels of improved design the losses of mechanical energy through leakage and frictional resistance at the annular sliding joints, viz. at gaps between the rims and circumferential faces of the pump wheel, the guide wheel and the turbine wheels, are substantially reduced as compared with hydrodynamic couplings of known design.

Another object of the invention is to thus design the wheel structure of hydrodynamic couplings, that the blades of all the wheels and the inner concave faces of the shells or rims to which the blades are attached are readily accessible for shaping and finishing operations such as grinding, facing, milling, polishing etc., so that accurately shaped and perfectly smooth surfaces, causing a minimum of frictional resistance, are presented to the working liquid on circulating through the bladed wheels.

In connection therewith the invention aims at simplifying in general the setting, moulding, turning, resetting, machining and other operations involved in making the wheels and other component parts of hydrodynamic couplings so as to substantially reduce their total weight and the cost of their production and to facilitate their assemblage, maintenance and repair.

Still other objects of the invention will become incidentally apparent hereinafter to practitioners skilled in the manufacture of hydrodynamic couplings.

The nature and scope of the invention are briefly outlined in the appended claims and will be more fully understood from the following specification taken together with the accompanying drawing in which Figs. 1 and 2 are fragmentary sections taken longitudinally through the axis of torque converting hydrodynamic power transmission devices, designed according to this invention and shown by way of examples, while Fig. 3 shows a coupling in which no conversion of torque occurs, Fig. 1a is a fragmentary cross section taken along line I—I through the coupling shown in Fig. 1, and Fig. 2a is a fragmentary side elevation of a core ring of the modified design shown in Fig. 2.

Referring to the embodiments of my invention shown in Figs. 1 to 3, in which the pump, turbine and guide wheels of the couplings are designated P, P2, P3, T, T2, T3 and G, G2, respectively:

With the objects in view set forth above for cooperation with the said bladed wheels a core ring of circular cross sectional form, designated R, R2 and R3 respectively, is provided which encloses the fluid circuit at its inner circumference and which—in contradistinction to hydrodynamic couplings of known design—is made to be a separate member, viz. being capable of revolving at any speed independently of the wheels of the coupling.

In the course of the inventor's experimental work it has been found that with torque converting hydrodynamic couplings designed and tested by him the said core ring R generally tends to spontaneously attach itself to the guide wheel G of the coupling—apparently through forces, indicated by arrows a, which are produced by the working liquid, the pressure of which is highest in the exit-section of the pump wheel, viz. higher than in the wheel diametrically opposed thereto. It may be stated here, that at times the guide wheel may rotate freely in the same direction as the turbine wheel.

However with other specimens of such couplings, in which the wheels are arranged in a different sequence and have a different cross sectional shape, the core ring R may possibly revolve jointly and in engagement with another wheel— other than the guide wheel—or with no wheel at all, and will then assume a rotary speed which is of an intermediate value between the speeds of the other wheels.

Since the core ring is a separate member the inner channel walls c and the blades b of all the wheels, including the frontal faces f of the latter (Fig. 1a) are readily accessible during their manufacture for dressing, shaping and finishing operations such as turning, grinding, milling, polishing etc., so that accurately shaped and perfectly smooth surfaces are obtainable inside the wheels which will thus present a minimum of frictional resistance to the fluid passing therethrough and over the core ring. Likewise since the core ring is a separate member, accessible from all directions, it is an easy task to correctly shape the ring and to provide it with equally smooth surfaces.

I have found that the circular cross sectional shape is the most desirable one for the core ring—in contradistinction to shapes presenting a mixture of different curvatures or a mixture of flat and curved faces—inasmuch as circularly shaped surfaces can be produced on lathes, grinding, milling and like machines provided with relatively simple guiding members for the shaping tools, which must be simply moved in a circle around a pivot.

Braking tests have shown that as the result of the truly correct shape and the greater smoothness of the guiding faces, over which the working fluid passes, the losses of mechanical energy through frictional resistance are substantially reduced and the efficiency of the coupling is correspondingly enhanced—a desirable factor particularly with torque converters.

Subsidiary structural features, embodied according to this invention in the bladed wheels and the core ring, and which also make for a higher efficiency of the coupling by reducing other losses of mechanical energy, which are due to leakage and eddying of the working fluid at the sliding joints, are the following:

Closely interengaging convex and concave faces of contact $o$, $o'$, which both have substantially the same circular curvature and perfectly match each other, are provided at the core ring and the opposed frontal faces $f$ of the blades of that of the wheels, with which the core ring will spontaneously come into engagement, as explained in detail hereinbefore.

In the embodiments of the invention shown in Figs. 1 and 2 said concave faces of contact $o$, are provided on the guide wheels G, G2.

In this manner practically fluid-tight joints are obtained at $o$, $o'$.

At the frontal faces $f$ of the remaining wheels—viz. excepting that which is in engagement with the core ring—gaps $g$ are provided—the radius $r$ of the curvature of the faces $f$ being slightly larger than the corresponding radius $r'$ of the curvature of the core ring as indicated in Fig. 1a.

The frontal faces of the blades of those wheels separated by gaps from the core ring are formed with bevelled edges $e$, $e'$ so designed, that during their movement relatively to the core ring in either direction wedge shaped cushions of compressed working fluid, for which oil is preferably used, are formed and practically tight joints obtained;—such cushions of compressed oil are known from and characteristic of thrust bearings of the "Michel"-type for propeller shafts.

Another advantageous structural feature incorporated in the core ring according to this invention consists therein, that the ring is perfectly balanced as to its specific weight relatively to the specific weight of the working fluid—in other words: the thickness of the walls and the material, of which the ring is made—preferably light and tough metals of great strength, such as aluminium-alloys—relatively to the total volume of the core ring is so chosen, that the ring will be substantially in a state of equilibrium within the working fluid; the total weight of the core ring being substantially equal to the buoyancy imparted to it by the working fluid when fully immersed in the latter.

The core ring—by reason of its relatively light weight and its equilibrium within the working fluid will more freely yield to any external forces such as indicated by arrows $a$ in Fig. 1 and referred to in detail hereinbefore.

As indicated in Fig. 3, the balanced core ring R3 may conveniently be made from two or more open shells $s$, $s'$, made of sheet metal and having annular seams $i$, $i'$, at which the shells are joined together by welding, soldering or like operations.

Various other changes and modifications may be made in the structural details, cooperation and interengagement of the bladed wheels and the core ring of hydrodynamic couplings of the improved design described above, without substantially departing from the spirit and the salient ideas of this invention, and without sacrificing any advantages obtained thereby:

For instance supporting means permitting free flow of the working fluid may be conveniently provided for rotatably and slidably mounting the core ring relatively to the central axis of the coupling:

As shown in Figs. 2 and 2a by way of an example said supporting means comprises a spider in the form of a bushing $u$ loosely mounted on the hollow shaft $h$, to which the guide wheel G2 of the coupling is keyed, and a plurality of spaced stay bolts or spokes $u'$.

It will be seen that, although the core ring is under control as to its radial distance from the main axis of symmetry the ring is all the same free enough to bodily move in the direction of the main axis of the coupling so as to rotate in close engagement with the guide wheel G2.

Core ring R2 (Fig. 2) may be mounted to equal advantage on a non-slidable bushing, so as to remain independent of all the wheels and not come into contact with any of the latter.

What I claim is:

1. In a power transmission device of the hydrodynamic type for interconnecting rotary shafts a plurality of bladed wheels cooperatively associated with each other, through which the working fluid circulates in a single closed circuit, and a hollow core ring of substantially circular cross sectional form enclosing the said fluid circuit at its inner circumference, yet being a separate member so as to be capable of moving independently of the wheels of the coupling.

2. A hydrodynamic power transmission device having the features outlined in claim 1, in which said core ring is so balanced as to its total weight and thickness of its walls, relatively to its total volume and to the specific weight of the working liquid, that it will be substantially in a state of equilibrium within the working liquid, viz. the weight of the core ring being substantially equal to the buoyancy imparted to it by the working fluid.

3. A hydrodynamic power transmission device having the features outlined in claim 1, in which said core ring is composed of open shells made from sheet metal and having annular seams at which they are joined together.

4. A hydrodynamic power transmission device having the features outlined in claim 1, in which tightly fitting faces of contact viz. of equal curvature are provided at the core ring and the frontal faces of the blades of that of the wheels, with which the rings is usually in contact, when the coupling is working, whereas gaps will be formed between the core ring and the opposed frontal faces of the blades of the other wheels, viz. the radius of their curvature being larger than the corresponding radius of the core ring.

5. A hydrodynamic power transmission device having the features outlined in claim 1, in which tightly fitting faces of contact are provided at the core ring and the frontal faces of the blades of that of the wheels with which the ring is usually in contact, when the coupling is working, whereas gaps will be formed between the core ring and the opposed frontal faces of the blades of the other wheels, viz. the radius of their curvature being larger than the corresponding radius of the core ring, the frontal faces of the blades being formed with bevelled edges, so designed that during their movement relatively to the core ring in either direction wedge shaped cushions of compressed liquid are produced.

6. A hydrodynamic power transmission device having the features outlined in claim 1, in which said core ring is fixed to a spider, permitting free flow of the working fluid, said spider being attached to a bushing, which surrounds the central axis of the hydrodynamic power transmission device and permits free movement of the core ring in the axial directions.

HANNS STEPHAN WILHELM BÖLLINGER.